T. H. MADGETT.
LIQUID MEASURING AND DISCHARGING DEVICE.
APPLICATION FILED JULY 20, 1910.
1,004,053.
Patented Sept. 26, 1911.
2 SHEETS—SHEET 1.
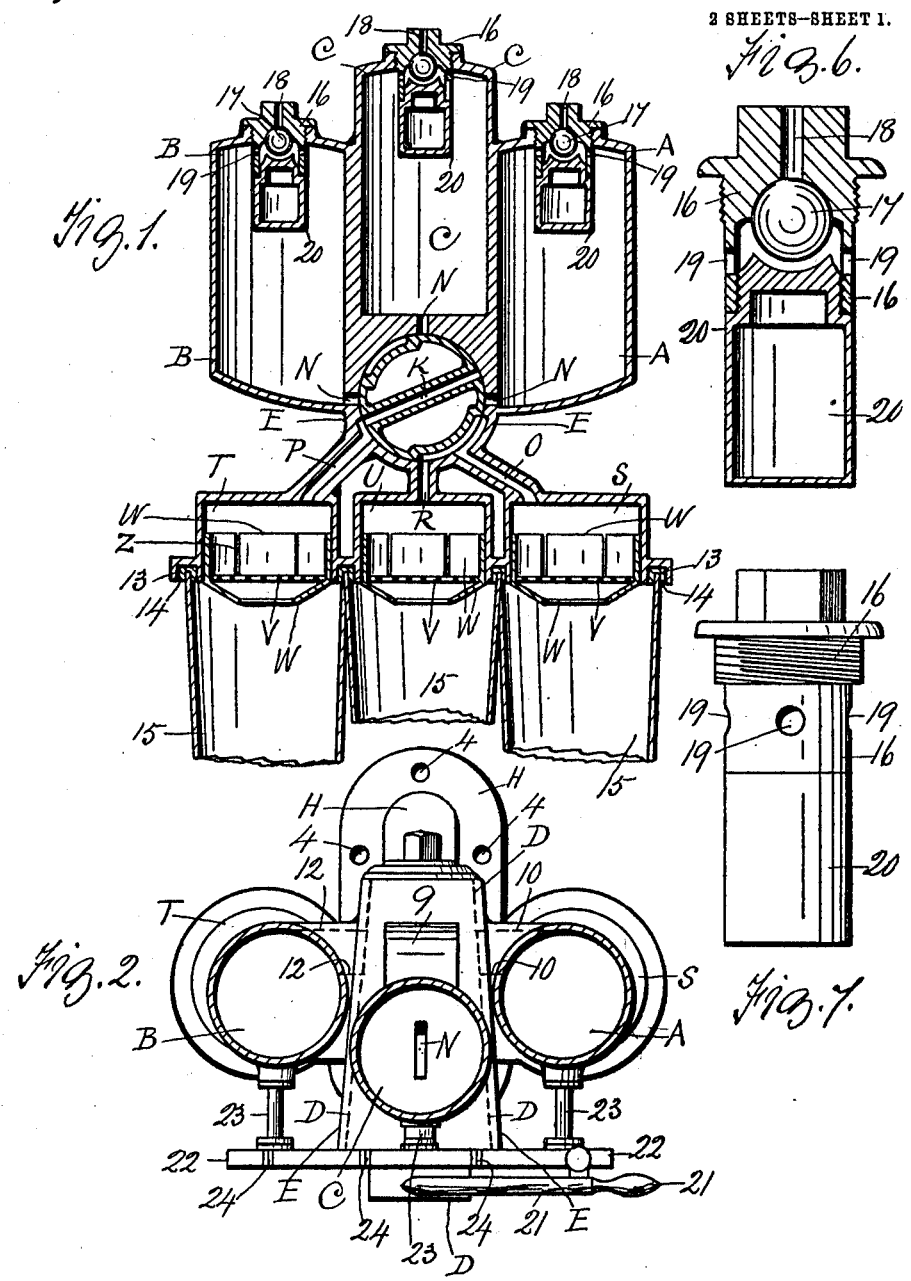

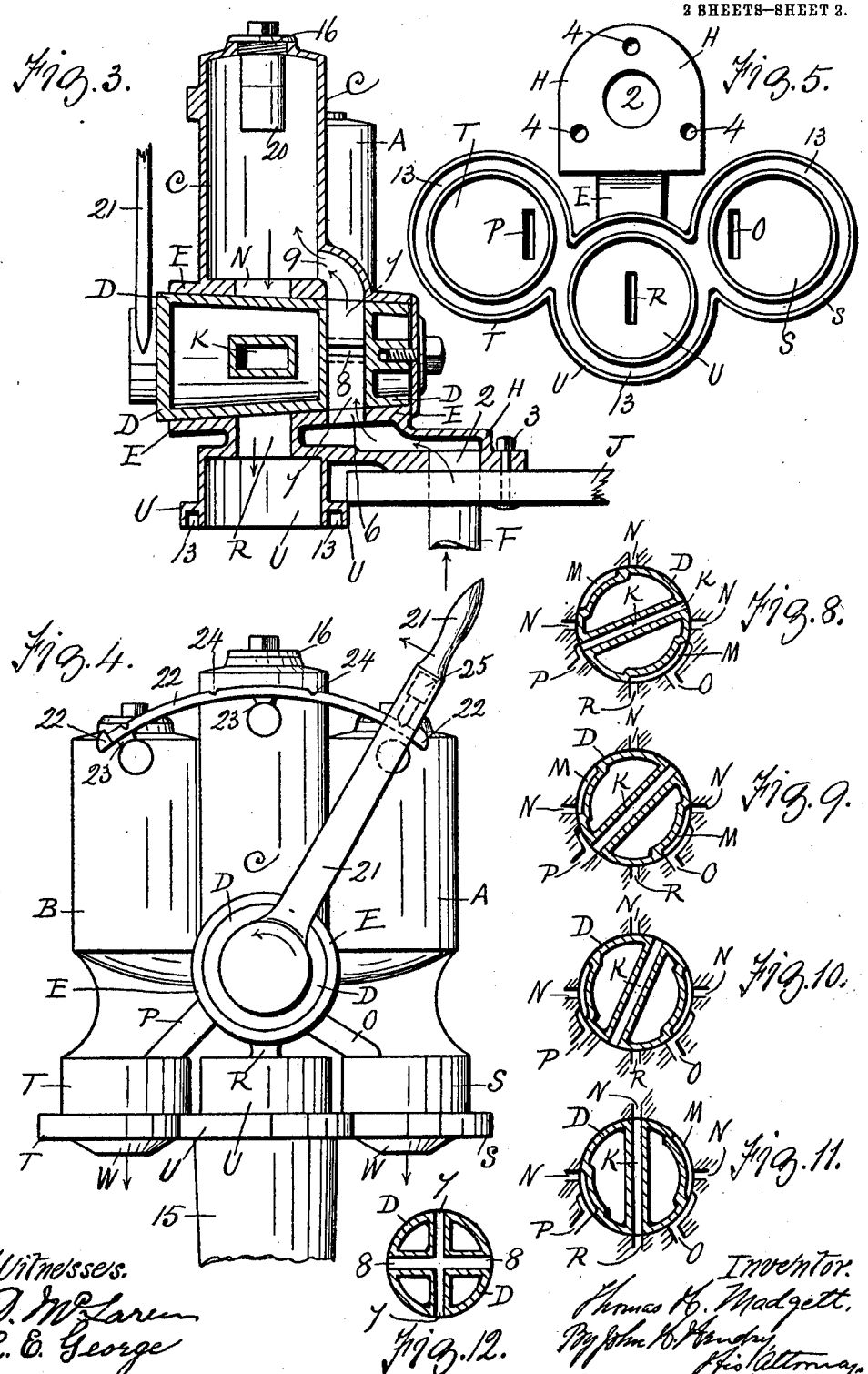

UNITED STATES PATENT OFFICE.

THOMAS H. MADGETT, OF HAMILTON, ONTARIO, CANADA.

LIQUID MEASURING AND DISCHARGING DEVICE.

1,004,053.   Specification of Letters Patent.   Patented Sept. 26, 1911.

Application filed July 20, 1910. Serial No. 572,884.

*To all whom it may concern:*

Be it known that I, THOMAS H. MADGETT, a subject of the King of Great Britain, and resident of Hamilton, in the county of Wentworth, in the Province of Ontario, Canada, have invented new and useful Improvements in Liquid Measuring and Discharging Devices, of which the following is a specification.

My invention relates to improvements in liquid measuring and discharging device or machine in which multiple vertical cells are arranged in proximity one with the other, and connected with a horizontal operative plug, which is adapted to communicate with said cells to allow the filling and the discharging of the liquid respectively to, and from the cells.

The objects of my invention are, first, to provide means whereby multiple cells may contain a certain measure of liquid, second, to provide means whereby a predetermined measure of liquid may be discharged in succession or simultaneously from said cells, and into tumblers, third, to provide inserted means in the cells, whereby a greater or a lesser predetermined measure of liquid may be discharged therefrom; fourth, to provide means whereby the material foam or froth, in some kinds of liquids, may very largely, be prevented from discharging into the arranged receiving, or drinking tumblers; and fifth, to afford facilities for filling as many tumblers as there are cells in the machine in rapid succession, or one, two or three at the same time and with a minimum of froth. I attain these objects by the mechanism illustrated in the accompanying drawing, in which:—

Figure 1 is a sectional elevation of the device, or machine, in normal position, showing three liquid vessels, and three lower tumblers in receiving position, the lower parts of said tumblers being broken away. Fig. 2 is a plan of the same, the three liquid cells being in section. Fig. 3 is a sectional side elevation of the same, showing the liquid supply passages to the cells. Fig. 4 is an elevation, showing the operating lever connected to the large end of the tapered liquid controlling plug. Fig. 5 is a view of the tumbler receivers as viewed from the underside of the machine. Fig. 6 is an enlarged sectional elevation of one of the liquid displacement plugs which is adapted for insertion in the upper parts of the liquid cells. Fig. 7 is an elevation of Fig. 6 of the drawing. Fig. 8 is a cross section of the horizontal operating plug, when in normal position, through the liquid discharge ports thereof in the larger part of the plug and shown closed to the ports in the plug seating, or casing. Fig. 9 is a cross section of the operating plug showing the same rotated to position to allow the filling of the first, or right-hand tumbler, which is shown in Fig. 1, of the drawing. Fig. 10 is a cross section of the operating plug, showing the same rotated to position to allow the filling of the left-hand tumbler as well as the right-hand tumbler. Fig. 11, is a cross section of the plug, showing the same rotated to position, to allow the contents of the centrally located vessel to discharge into the centrally located tumbler as well as into the right and left-hand tumblers. Fig. 12 is a cross section of the plug, through the liquid supply opening in the smaller end of the plug and which communicates with the three cells, independently thereby filling all three tumblers.

Similar letters refer to similar parts throughout the several views.

In the drawing, A, B and C are vertical cells, the middle cell being higher than the other two, to allow a horizontal plug D in its casing E, to divide said cells, and to be adjacent therewith.

F, is a pipe suitably connected with an opening 2, in the supporting flange, or base H, of the casing, said base being secured to a table or bench J, by means of bolts, or screws 3, shown in Fig. 3. The holes 4, for the bolts 3, are shown in Figs. 2 and 5 of the drawing. Liquid is forced up through the pipe F, in the usual manner, and passes through the opening 6, in the casing E, and through the supply passage 7, through the small end portion of the plug D. The plug D has another intersecting supply passage 8, at right angle thereto and communicating therewith. The supply passage 7 communicates with the supply port 9, in the lower part of the cell C, and the passage 8 communicates with the passages 10 and 12 in the sides of the cells A and B, and shown in broken horizontal lines in Fig. 2, of the drawing. The plug is now normal, that is, shown open to the liquid supply passages 9, 10 and 12, thereby admitting liquid to the cells C, A and B, respectively, and through independent passages, as shown in Figs. 2 and 3.

The plug D, has a discharge passage K, through the larger portion thereof, and pockets M in the periphery of the plug, and corresponding with the passage K in width. Each of the cells has a lower discharge port N. The passage K when rotated communicates with the port N in the cell C. The passage K, together with the pockets M, also communicate with the discharge ports R, O and P, respectively, of the casing E, when the plug D, is rotated. The ports O, P and R, enter the upper parts of the tumbler cylinders S, T, U, respectively. The cylinders S, T and U referred to, are provided with similar screens or sieves V, to retain the excess amount of foam and which form a part of the annular auxiliary shells W, having lower contracted open ends, and which fit snugly in the cylinders, and are removable therefrom. The part of the shells which enter the cylinders have suitable slits Z, to allow the snug fit and the easy removal of said vessels for cleaning purposes, and for adjustment to deliver more or less foam in the tumbler below.

On the underside of the cylinders S, T and U, are recesses 13, shown very full, in Figs. 3 and 5, of the drawing, and in Fig. 1 of the drawing is shown a flexible annular lining 14, in said recesses adapted to receive the rims of the tumbers 15, to protect said tumblers from the metal cylinders, and also that it may be a noiseless operation when bringing one or more tumblers to position in the annular recess formed in said lining, thereby preventing the liquid from overflowing.

The upper ends of the cells A, B and C are provided with liquid displacement plugs 16, all of which are similar, and screwed into the necks of the cells. Each plug 16, has a ball valve 17, and air vent 18, which communicate with the valve 17, and is removable. The lower portion of the plug 16, is provided with a liquid displacement extension 20, which is screwed therein, and the upper part of the extension has a rest for the ball 17, when not pressed upward against the seat.

The side holes 19 in the upper part of the plug allow the liquid to enter and force the ball upward to its seating and thereby closing the ball valve, as shown especially in the large view of Fig. 6, of the drawing. The lower portion 20, of the plug 16, is intended to be of various lengths, to provide for the various measurements of liquid required in the cells, for instance to increase the measurement of liquid in a cell, the plug 16 would be removed and a lesser plug 20 would be screwed into the plug 16; which would then be screwed into the cell, as shown, thereby increasing the volume of liquid in the cell.

21, is a lever, the lower end of which is secured to the larger end of the horizontal tapered plug D, and is adapted to rotate the plug.

22 is a quadrant, or segment, located centrally with the plug and is rigidly secured to the cells A, B and C, by means of suitable brackets 23, of approved design and shape. The segment 22 has notches, or suitable recesses 24, and the lever 21 is provided with a suitable catch or bolt 25, adapted to enter one of said notches 24, and to remain there until released by drawing the lever away therefrom, this particular mechanism comprising quadrant and lever is not new of itself.

The lever 21 is in position, as is also the plug D, to have the liquid supply, from the pipe F, open to supply the cells A, B and C, the discharge ports N being closed by means of said plug, as shown in Figs. 1, 3 and 8 of the drawing. When the lever is brought to the second notch 24 of the quadrant, the plug D is thereby rotated to open and allow the first cell A, to discharge through the port N, into a pocket M, and through the port O, as shown in Fig. 9, and into the first, and right-hand tumblers 15. When the lever is brought to the third notch in the quadrant, the plug D is then brought to position, as shown in Fig 10, thereby allowing the discharge from the left-hand cell B, through the port P, and into the tumbler 15 opposite thereto. When the lever is brought to the left-hand and last notch 24, in the quadrant, the plug D, is then brought to position, as shown in Fig. 11, thereby allowing the middle cell C, to discharge through the passage K, of the plug, and through the port R, in the casing E, thence into the middle tumbler 15, at this time all the discharge ports are open, and the supply ports to the cells are closed. The supply ports are open only when the lever is in position as shown in Fig. 4 of the drawings. In rotating the plug from its normal position, as shown, in Figs. 1, 3, 4 and 8, the supply ports close immediately before the first discharge port is open, and remains closed until the lever is again returned to normal position.

The operation of the machine is as follows: The liquid is forced, by pressure, through the pipe F, the opening 6, the passage 7 in the plug D, thence through the ports 9, and into the middle cell C. The liquid at the same time passes through the passage 8, in the plug D, and thence through the passages 10 and 12, and into the cells A and B respectively. The tumbler, or tumblers, are then brought to position in the prepared recesses in the lining 14, the lever is then moved to the first notch 24 in the quadrant, thereby rotating the plug D to a position to allow the discharge port N of the cell A to communicate with the discharge port O, and then through the sieve V and into the right-hand tumbler 15. When the lever is moved to the next notch 24, the plug D is consequently rotated to allow similar discharge ports to open and thereby discharge through the port P, and thence into the left-hand tumbler. When the lever is moved to the next and last notch the discharge ports are then open, the discharge passage K in the plug D, is then in vertical alinement with the central port N, and the port R, which leads to the central tumbler.

The machine is adapted to fill one, two or three tumblers in succession independently, or two together, or three together simultaneously as is described, and comparatively free from froth. By elevating the screen V, the froth on the liquid is increased in volume, and when depressed a lesser volume of froth will remain on the top of the liquid in the tumbler 15.

What I claim as my invention and desire to secure by Letters Patent, is:—

1. In a liquid measuring and discharging device, vertically arranged cells adjacent one with the other, and having supply ports in the lower parts thereof, a casing supporting the cells, and having supply openings, a horizontal plug adapted to rotate in the casing and having supply passages at right angles to each other and adapted to communicate with said ports and supply the cells, a supply pipe connected to the openings of the casing, and means connected to the plug to rotate the same to admit and to cut off the supply of liquid to the cells.

2. In a liquid measuring and discharging device, a stationary casing, a supply pipe communicating therewith, vertical cells supported on the casing, and adjacent one with the other and having supply passages dependent on the supply pipe, a horizontal plug having independent supply and discharge passages adapted to rotate in the casing to supply the cells, and adapted to communicate with one or more passages in the cells, to discharge one or more cells immediately the supply is cut off.

3. In a liquid measuring and discharging device, a plurality of cells adjacent one with the other, a casing having a supporting base, adapted to support said cells, a plug adapted to rotate in the casing and having independent passages at right angles to each other and adapted to communicate with the cells, making the supply of each cell independent of each other and at the same time receiving their supply from the same source, said plug adapted in its rotation to cut off the supply of liquid, and to simultaneously discharge one or more of the cells.

4. In a liquid measuring and discharging device, a plurality of cells having lower supply passages, a casing having supply openings and a base supporting the cells, a rotatable plug in said casing having independent passages at right angles one with the other and adapted to communicate with the openings in the casing and with passages in the cells to supply said cells, said cells having discharge openings to communicate with the plug and with corresponding openings in the casing, to discharge the liquid therefrom.

5. In a liquid measuring and discharging device, a plurality of cells having lower passages, a casing having supply and discharge openings, and a base supporting the cells, a plug having passages at right angles one with the other adapted to rotate in the casing, passages in the cells communicating with the passages in the plug, that when rotated the passages in the plug communicate with the passages in the cells, to convey the liquid through their respective discharge openings in the casing.

6. In a liquid measuring and discharging device, a plurality of cells adjacent one with the other, a casing supporting the cells, removable plugs in the upper parts of the cells, said plugs having vent openings and provided with ball valves, means in the plugs to admit liquid therein, and force said balls to close said vents, and interchangeable liquid displacement means connected to the plugs adapted to increase or to decrease the quantity of liquid in said cells, according to the relative sizes of said interchangeable means.

7. In a liquid measuring and discharging device, a plurality of cells, adjacent to each other, and having independent supply passages, and independent discharge passages, a casing having supply openings communicating with the cells, and a base supporting the cells, a plug having supply passages at right angles one with the other and a discharge passage through the same and pockets on the periphery thereof, said plug adapted to be rotated in the casing to bring one or more of said pockets to communicate with one or more discharge passages in the casing, to discharge one or more cells.

8. In a liquid measuring and discharging device, a plurality of cells, adjacent to each other, and having independent discharge passages having supply openings adapted to communicate with the cells, and a base supporting the cells, discharge cylinders corresponding with and independently communicating with the casing, removable shells in the lower and open parts of said cylinders, and having their lower end open and contracted, and screens in the body of the shells, to retain the excess amount of foam therein.

9. In a liquid measuring and discharging device, discharge cylinders externally connected one with the other, as set forth, and having annular recesses, flexible material secured in said recesses and adapted to receive the rims of tumblers under pressure, thereby producing a water tight joint to the top of the tumbler, adjustable shells having their lower ends contracted and open, and screens in the shells above said contracted parts.

THOMAS H. MADGETT.

Witnesses:
JOHN H. HENDRY,
JAS. M. SHEPARD.

Copies of this patent may be obtained for five cents each, by addressing the "Commissioner of Patents, Washington, D. C."